United States Patent [19]

Iwasa et al.

[11] Patent Number: 4,807,078
[45] Date of Patent: Feb. 21, 1989

[54] FLEXIBLE DISK JACKET COLORED WITHIN SPECIFIC MUNSELL RANGES

[75] Inventors: Masakazu Iwasa; Kazuhiko Morita, both of Odawara, Japan

[73] Assignee: Fuji Photo Film Co., Ltd., Japan

[21] Appl. No.: 143,247

[22] Filed: Jan. 4, 1988

Related U.S. Application Data

[63] Continuation of Ser. No. 669,320, Nov. 7, 1984, abandoned.

[30] Foreign Application Priority Data

Nov. 11, 1983 [JP] Japan ................................ 58-212219

[51] Int. Cl.⁴ ............................................. G11B 23/03
[52] U.S. Cl. ..................................................... 360/133
[58] Field of Search ................ 360/133, 132; 206/444, 206/312–313

[56] References Cited

U.S. PATENT DOCUMENTS

| | | | |
|---|---|---|---|
| 4,352,132 | 9/1982 | Gyi | 360/133 X |
| 4,400,753 | 8/1983 | Beebe et al. | 360/133 |
| 4,413,298 | 11/1983 | Pecsok et al. | 360/133 |
| 4,485,421 | 11/1984 | Hoshino | 360/133 |

OTHER PUBLICATIONS

"Strategic Systems Corporation", BYTE Publications, Inc., Sep. 1983, vol. 8, No. 9, p. 160.

*Primary Examiner*—Stuart N. Hecker
*Assistant Examiner*—David J. Severin
*Attorney, Agent, or Firm*—Pasquale A. Razzano

[57] ABSTRACT

A flexible disk jacket for accommodating therein a disk-like magnetic recording medium for rotation to form a flexible disk is formed by folding a plastic sheet into a bag-like shape. The plastic sheet is colored in a color having a Munsell value not smaller than 3.

3 Claims, No Drawings

FLEXIBLE DISK JACKET COLORED WITHIN SPECIFIC MUNSELL RANGES

This application is a continuation of application Ser. No. 669,320, filed Nov. 7, 1984 now abandoned.

BACKGROUND OF THE INVENTION

1. Field of the Invention

This invention relates to a flexible disk jacket for accommodating therein a disk-like magnetic recording medium to form a flexible disk sometimes referred to as a "floppy disk" or "diskette".

2. Description of the Prior Art

Flexible disks generally comprise a casing (generally referred to as a "flexible disk jacket") and a disk-like magnetic recording medium accommodated therein for rotation. The flexible disk jacket is formed by folding a plastic sheet into a bag-like shape. The recording medium comprises a flexible base sheet such as of polyethylene terephthalate (PET) or the like which is circular in shape and bears a magnetic recording layer on one side or both sides thereof. Generally, the outer surface of the flexible disk jacket is black in color due to carbon added to the plastic sheet material of the jacket as an antistatic agent in order to prevent the jacket from being electrostatically charged.

However, black flexible disk jackets are disadvantageous in that any fingerprints are clearly visible. Thus, the outer surface of the conventional flexible jackets has been matted by embossing in order to prevent fingerprints thereon from showing up clearly. However, this measure has not been considered to be satisfactory.

Further, there is a demand for flexible disk jackets colored in various fresh chromatic colors as such flexible disk jackets would be more attractive in appearance and could be easily classified by color. Further, fingerprints on a surface colored in a color other than black are less clear than those on a surface colored in black.

SUMMARY OF THE INVENTION

In view of the foregoing observations and description, the primary object of the present invention is to provide a flexible disk jacket the outer surface of which is colored in a color other than black and is resistant to marking with fingerprints.

In accordance with the present invention, the flexible jacket is formed by folding into a bag-like shape a plastic sheet colored in a color the Munsell value V of which is not smaller than 3.

As is well known, the Munsell value V represents the lightness of color in the Munsell color system. When the color of the outer surface of the flexible color jacket has a Munsell value V not smaller than 3, any fingerprints thereon do not show clearly. It is preferred that the outer surface be matted in order to further resist marking with fingerprints.

The flexible disk jacket in accordance with the present invention colored in a relatively light color is more attractive in appearance than the conventional black one, and can be directly marked with a writing tool.

DETAILED DESCRIPTION OF THE INVENTION

The flexible disk jacket in accordance with the present invention is the same in structure as know flexible disk jackets except that the outer surface thereof is colored in a color (including white) other than black. In order to color the outer surface of the flexible disk jacket, coloring agent may be added to the plastic sheet material forming the jacket or at least one colored layer may be superposed on the surface of the plastic sheet forming the jacket by coating, laminating and the like.

The following pigments may be used:

yellow-orange pigments—chrome yellow, zinc yellow, cadmium yellow, Hansa yellow, flavanthrone yellow, benzidine yellow, molybdate orange, yellow oxide, and benzidine orange;

red pigments—red oxide, thioindigo, cadmium red, anthraquinone red, quinacridone red, and chromium tin;

blue-green-violet pigments—phthalocyanine blue, phthalocyanine green, indanthrene blue, chrome oxide green, cobalt green and violet oxide;

white pigments—titanium oxide, zinc oxide, zinc sulfide, and white lead.

In order to facilitate classification of the flexible disk jackets of the present invention by color according to their applications, it is preferred that colors different from each other at least by 1 in Munsell value V, at least by 1 in Munsell chroma C or at least by 2.5 in Munsell hue H be used. Otherwise, it is hard to clearly distinguish the colors from each other.

It is preferred that the outer surface of the flexible disk jackets be matted by embossing or sand mat process in order to further improve resistance to fingerprints.

Since, basically, the flexible disk jacket of the present invention is formed of the same material and has the same structure as the known ones, the flexible disk jacket of the present invention is not inferior to the known ones in heat resistance, dimensional stability, heat sealability, scratch resistance, antistatic properties and the like.

EXAMPLE

A plurality of plastic sheets different from each other in hue (H), value (V) and chroma (C) were prepared and their resistance to fingerprints was evaluated. A black plastic sheet for forming the known flexible jackets was used as a control. All the plastic sheets were embossed using the same embossing roll as used in embossing the known flexible jacket.

The plastic sheets were touched by a hand coated with hand cream and the resistance to fingerprints was visually evaluated by observation of the fingerprints left thereon. The results are shown in the following table. As can be understood from the table, the plastic sheets having a Munsell value V not smaller than 3 exhibited satisfactory resistance to fingerprints.

TABLE

| plastic sheet | | hue (H) | value (V) | chroma (C) | Clarity of fingerprints |
|---|---|---|---|---|---|
| black (conventional) | | — | 1.5 | — | x |
| red | A | 5 R | 5 | 10 | ◉ |
| | B | " | 2.5 | 2 | △ |
| | C | " | 6 | 7 | ◉ |
| | D | " | 3 | 8 | ○ |
| yellow | A | 5 Y | 8 | 7 | ◉ |
| | B | " | 2 | 2 | △ |
| | C | " | 3 | 4 | ○ |
| | D | " | 4 | 8 | ◉ |
| green | A | 5 G | 1.5 | 3 | x |
| | B | " | 6 | 10 | ◉ |
| | C | " | 3 | 8 | ○ |
| | D | " | 4 | 10 | ◉ |
| blue | A | 5 B | 2 | 3 | x~△ |
| | B | " | 3 | 6 | ○ |

TABLE-continued

| plastic sheet | | hue (H) | value (V) | chroma (C) | Clarity of fingerprints |
|---|---|---|---|---|---|
| | C | " | 6 | 10 | ◉ |
| | D | " | 4 | 8 | ◉ |
| blue-green | A | 2.5 BG | 2 | 2 | x |
| | B | " | 3 | 6 | ○ |
| | C | " | 4 | 10 | ◉ |
| | D | " | 8 | 8 | ◉ |
| violet | A | 2.5 PB | 5 | 10 | ◉ |
| | B | " | 2 | 3 | △ |
| | C | " | 3 | 8 | ○ |
| | D | " | 6 | 4 | ◉ | x Clear
△ Relatively clear
○ Relatively unclear
◉ Unclear

We claim:

1. A flexible disk jacket for accommodating therein a magnetic recording medium to form a flexible disk formed by folding a plastic sheet into a bag-like shape characterized in that at least substantially the entire outer surface of the plastic sheet itself is colored in a chromatic color having a Munsell chroma in the range of 4-10, a Munsell hue in the range of 2.5-5 and a Munsell value in the range of 4-8.

2. A flexible disk jacket as defined in claim 1 in which said outer surface of the plastic sheet is matted.

3. A flexible disk jacket as defined in claim 1 in which at least one pigment selected from the group consisting of yellow-orange pigments, red pigments, blue-green violet pigments and white pigments is used for coloring said plastic sheet.

* * * * *